UNITED STATES PATENT OFFICE 2,466,770

A STABLE COATING COMPOSITION AND A PROCESS OF MAKING IT

Robert T. Hucks, South River, and Roy R. Denslow, Nutley, N. J., assignors to E. I. du Pont de Nemours & Company, Wilmington, Del., a corporation of Delaware No Drawing. Application March 2, 1946, Serial No. 651,615

12 Claims. (Cl. 106—193)

This invention relates to a stable coating composition of unusual beauty and transparent color effects and a process of making it.

The customary basic requirements for coloring matter when used in coating compositions, involve essentially high hiding power, whereby an opaque appearance is secured, and good durability in order that the coating may withstand deterioration from destructive forces of light and exposure to the elements. Pigments which provide an opaque appearance play a large part in contributing to the general durability of such products. Recently there has been a trend toward the so-called "transparent" finishes, particularly when finely divided metallic powders, such as aluminum powder, are incorporated therein. In the past, transparent finishes have been obtained through the use of organic dyes but the durability and color stability of such finishes, particularly when exposed outdoors, is relatively very poor, rendering them useless for the finishing of automobiles. Important progress, however, has been made in producing transparency with certain colors including greens, blues, and maroons through the use of the process described in U. S. Patent 2,140,745, although this method did not provide the desired high transparency in black and gray finishes with pigments heretofore available for producing these colors. Further important progress has been made in producing finishes of high transparency by use of the pigments disclosed in U. S. Patent 2,335,760.

This invention, therefore, has as a primary object the provision of durable black and gray finishes of striking appearance and durability not obtainable by any means heretofore known. Another object is the provision of new pigment materials which may be satisfactorily employed in cellulose derivative coating compositions. Another object is the provision of black and gray finishes which are substantially transparent. A further object is the provision of a coating composition in which metallic powders, such as aluminum, nickel, etc., may be incorporated to provide a finish of pleasing transparent metallic appearance of unusual brilliancy. A further object is the provision of a transparent finish which has satisfactory durability and color stability. A still further object is the provision of gray transparent finishes containing aluminum powder which are best described as warm grays. Other objects will appear hereinafter.

These objects are accomplished through the use, in cellulose derivative vehicles, preferably a cellulose nitrate vehicle, of a pigment consisting of hydrous ferric-ferrous oxide, incorporated in said vehicle directly from the "pulp" state, preferably by means of a "flushing" process. The process of U. S. Patent 2,140,745 has been found to be particularly useful for this purpose.

U. S. Patent 2,335,760 discloses a new brown or black pigment of unusual transparency and beauty of color. This is described as hydrous ferric-ferrous oxide. We have now found that the durability as regards color stability of black and gray enamels on exposure outdoors can be markedly improved by certain changes in the manufacturing procedure. These changes result in coating compositions which show little if any color change on continual exposure outdoors in tropical climates, such as Florida, for over a year. The compositions have no tendency to become browner or in any way deviate from the original shade.

Heretofore, as far as we are aware, the new material has not been employed as a pigment in coating compositions. In order to secure the greatest improvement in color and transparent effects, it is essential that the new pigment be transferred to the cellulose derivative vehicle direct from the wet pulp state, preferably by means of a "flushing" process such as described in U. S. Patent 2,140,745, avoiding the customary steps of drying or sintering the pigment prior to its incorporation in the coating composition by conventional dispersion methods.

In general, this invention may be carried out by precipitating a mixture of hydrous ferric and ferrous oxide in an aqueous alkaline medium and subsequently oxidizing the precipitate until the ferric content is between 95% and 99.8% and the ferrous content is between .2% and 5%. The resulting product is then filtered and washed free of soluble salts. While in its water wet form, this hydrous ferric-ferrous oxide pigment is kneaded with an uncolloided cellulose derivative, a blown non-drying vegetable oil, and a solvent plasticizer until the pigment has been transferred from the water to the oil phase, the separated water is then removed and finally solvent, diluent, and resin modifier are added.

A preferred way of carrying out this invention involves first oxidizing a ferrous salt solution with any suitable oxidizing agent up to the point where approximately 50% of the iron in the solution is in the ferric state. This is then precipitated by addition of an aqueous sodium hydroxide solution as a mixture of ferric hydroxide and ferrous hydroxide. The precipitate is given a further oxidation and caustic treatment until the ferric content is between 95% and 99.8% and the ferrous content is between .2% and 5%. The resulting product is then filtered and washed free of soluble salts and is incorporated in a cellulose derivative vehicle as described above.

One of the preferred methods of preparing the hydrous ferric-ferrous oxide is to make up to 3 liters the following:

| | Grams |
|---|---|
| Copperas (FeSO$_4$.7H$_2$O) | 278 |
| H$_2$SO$_4$ (100%) | 25 |
| NaClO$_3$ | 8.9 |

This solution is heated to 180° F. and then run into (in 30 minutes) 100 grams of NaOH dissolved in 1½ liters of water and heated to 90° F. The mixture is heated to 130° F. in 15 minutes and then 25 grams of Na$_2$Cr$_2$O$_7$.2H$_2$O and 8.17 grams of H$_2$SO$_4$ dissolved together in 100 cc. of water are added. It is then heated to 180° F. in 20 minutes and 10 grams of NaOH dissolved in 100 cc. of water is added. After 10 minutes stirring at 180° F., it is filtered and washed sulfate free. The pH after the strike was 7.3. Ten minutes after the sodium bichromate addition the pH was 3.9. The final pH was 10.1. The pigment is then ready for use without drying as disclosed hereinafter.

A second method of preparing the hydrous ferric-ferrous oxide is to make up to 3 liters the following:

| | Grams |
|---|---|
| Copperas (FeSO$_4$.7H$_2$O) | 278 |
| H$_2$SO$_4$ (100%) | 25 |
| NaClO$_3$ | 8.9 |

This solution is heated to 180° F. and then run into (in 20 minutes) 100 grams of NaOH dissolved in 1½ liters of water and heated to 180° F. The mixture is heated to boiling and 8.9 grams of NaClO$_3$ dissolved in 100 cc. water are added. It is then boiled for 20 minutes and 25 grams of NaOH dissolved in 100 cc. of water is added and held for 10 minutes at boiling. Final pH=11.5. Filter and wash sulfate free. The pigment is used without drying.

A third method of preparing the hydrous ferric-ferrous oxide is to make up to 3 liters the following:

| | Grams |
|---|---|
| Copperas (FeSO$_4$.7H$_2$O) | 278 |
| H$_2$SO$_4$ (100%) | 25 |
| NaClO$_3$ | 8.9 |

This solution is heated to 180° F. and then run into (in 20 minutes) 100 grams of NaOH dissolved in 1½ liters of water and heated to 180° F. The mixture is heated to boiling and 25 grams of Na$_2$Cr$_2$O$_7$.2H$_2$O and 8.17 grams of H$_2$SO$_4$ (100%) dissolved together in 100 cc. of water are added, and the mixture boiled for 20 minutes, after which is added 25 grams of NaOH dissolved in 100 cc. of water and boiling continued for 10 minutes. The final pH was 11.5. The precipitate is then filtered and washed sulfate free. The pigment is to be used without drying.

The exact chemical composition of the pigments prepared according to the above procedures is not known. This is particularly true as regards the actual amount of water of hydration. However, from experimentation it is known that pigments of this nature are relatively unstable to light, becoming browner in a coating composition when exposed outdoors if the ferrous iron is higher than about 5% of the total iron present. The procedures outlined above yield pigments containing about .2% to 4% ferrous iron based on the total iron present.

The following examples are given by way of illustration and no limitations are intended thereby except as indicated in the appended claims:

*Example 1*

1st portion:

| | Per cent |
|---|---|
| Cellulose nitrate (water wet—22.9% water) | 16.0 |
| Hydrous ferric-ferrous oxide pulp (70.0% water) | 4.5 |
| Blown castor oil | 3.2 |
| Dibutyl phthalate | 2.2 |
| Hydrous ferric-ferrous oxide pulp (70.0% water) | 2.5 |
| Dibutyl phthalate | 2.6 |

2nd portion:

| | |
|---|---|
| Denatured ethyl alcohol | 20.2 |
| Butyl acetate | 33.5 |
| Butyl alcohol | 6.2 |
| Resin solution | 9.1 |
| | 100.0 |

The viscosity characteristic of the cellulose nitrate used in this example is about 3 seconds as determined in accordance with the procedure outlined in A. S. T. M. Specifications D-301-33, Formula C.

The resin solution employed in the composition consisted of 30 parts of toluene and 70 parts of a synthetic resin of approximately the following composition:

| | Per cent by weight |
|---|---|
| Glyceryl phthalate | 60 |
| Coconut oil | 15 |
| Dibutyl phthalate | 25 |
| | 100 |

This resin may be conveniently prepared according to the procedure described in U. S. Patent 2,214,127.

The hydrous ferric-ferrous oxide used in this example contained about 4.2% ferrous iron.

The composition was prepared by the process described in U. S. Patent 2,140,745. In preparing the pigmented intermediate represented by the first portion, the cellulose nitrate and the aqueous pigment pulp consisting of a water slurry of the hydrous ferric-ferrous oxide in its original precipitated form and in the pigment-water proportions indicated, were charged into a kneading machine and mixed for about 5 minutes, after which blown castor oil in the amount shown was added and kneading continued for 30 minutes. During this cycle the temperature of the charge was maintained between 50° and 60° C.

The dibutyl phthalate was added and kneading continued until water separated. This occurred almost immediately. The separated water was decanted and the additional pigment pulp and dibutyl phthalate then charged into the kneading machine. Water again separated and was decanted. Kneading of the mass was continued for 30 minutes at a temperature of about 60° C. Residual water was removed by vacuum in accordance with the procedure of the above patent.

The resulting pigmented intermediate was combined with the ingredients of the second portion in an agitator mixer to produce a transparent durable black finish not heretofore obtainable with conventional black pigments.

The unusual transparency of the finish prepared from this composition is particularly noteworthy. Actual measurement with the Pfund Black and White Cryptometer described in Proc. A. S. T. M. 30, part II, page 880 (1930) showed the composition to have a hiding power of but 200 to 300 square feet per gallon at a 7% concentration in the lacquer vehicle. A hiding power determination of a similar enamel of like pigment concentration using a commercial black iron oxide dispersed by conventional ball mill method gave 700 to 800 square feet per gallon, a distinction which at once sets it apart from the pigment employed in the present invention in that it would have no utility for the purposes of the present invention.

Particle size measurements also serve to more precisely distinguish the new pigments. Such measurements made through the agency of an ultra-centrifuge show a mean diameter of the pigment used in Example 1 to be but 30 millimicrons and characterized by great uniformity; that of the commercial black iron oxide 500 millimicrons; or about seventeen times the average particle size of the hydrous ferric-ferrous oxide pigment. In order to obtain the highest degree of transparency and desired color, a hydrous ferric-ferrous oxide pigment of particle size less than 50 millimicrons in diameter is preferred and, in any event, the particle size should not exceed about 100 millimicrons.

Example 2

Brilliant and strikingly beautiful metallic finishes may be obtained by incorporating suitable amounts of finely divided aluminum powder in enamels containing the new pigment. The aluminum powder may be added direct in the form of a paste, an intermediate product now commercially available, for example, Alcoa Albron Paste #1580, consisting of approximately 66.5% of aluminum powder and 33.5% of mineral spirits and manufactured by the Aluminum Company of America or, for greater convenience, the paste may first be incorporated in a clear cellulose nitrate base solution and this product then added to the enamel containing the hydrous ferric-ferrous oxide. A suitable intermediate of the latter type consists of:

| | Per cent by weight |
|---|---|
| 1st portion: | |
| Aluminum paste (66.5% aluminum powder) | 7.5 |
| Butyl acetate | 4.0 |
| 2nd portion: | |
| Butyl acetate | 3.5 |
| 3rd portion: | |
| Cellulose nitrate | 16.0 |
| Ethyl alcohol (denatured) | 7.4 |
| Methyl ethyl ketone | 7.6 |
| Butyl acetate | 18.6 |
| Butyl alcohol | 9.0 |
| Petroleum naphtha (B. R. 95–135° C.) | 9.0 |
| Blown castor oil | 3.2 |
| Dibutyl phthalate | 4.8 |
| Synthetic resin solution | 9.1 |
| Malic acid | 0.3 |
| | 100.0 |

The viscosity characteristic of the cellulose nitrate used in this composition is about 3 seconds as determined in accordance with the procedure outlined in A. S. T. M. Specifications D–301–33, Formula C.

The resin solution used in this composition was the same type as that shown in Example 1.

The composition is best prepared by mixing the first portion in an agitator mixer for 2 hours followed by the addition of the second portion with further mixing of one hour and finally the addition of the ingredients of the third portion with a final 2-hour mixing cycle.

In preparing a suitable metallic enamel containing hydrous ferric-ferrous oxide, the above described aluminum tinting solution may be added with agitator mixing to a composition such as Example 1 in the proportion of 95% by weight of Example 1 composition to 5% by weight of the aluminum tinting solution. The resulting composition, when sprayed on a metal surface previously coated with a conventional primer and surfacer, gave a finish of unusual brilliancy and of warm gray appearance. For most purposes, the aluminum tinting solution containing about 5% metallic aluminum may be added in the proportion of between 0.5 and 20 parts by weight of aluminum tinting solution to from 99.5 to 80 parts by weight of the pigmented enamel, i. e., from .025 to 1.0% metallic aluminum in the finished composition.

As previously pointed out, the improved hydrous ferric-ferrous oxide employed as a pigment in the present invention, represents a new and novel advance in the transparent enamel art. Heretofore the wet labile pigment material has merely constituted an unisolated intermediate product in the preparation of black iron oxide and has had no apparent utility as a pigment per se until the present discovery of the unusual and pleasing effects secured through its use as a coloring material. The new pigment is not to be confused with the commercial black iron oxide pigments which are available as dry pigments, since these pigments are relatively quite opaque and cannot be treated in any known manner to afford the new results obtained in the present invention.

However, in order to obtain the results described, it is necessary to avoid the conventional drying, dry grinding and subsequent dispersion in the desired vehicle since if handled in this manner, the new effects are largely destroyed. Thus, it has been found necessary to transfer the pigment direct from the water slurry after precipitation, to the coating vehicle, omitting the customary drying step. This can be accomplished by "flushing" methods, preferably in accordance with the procedure described in U. S. Patent 2,140,745 when the coating vehicle consists essentially of a cellulose derivative or it may be performed by the simple expedient of mixing the pigment pulp and at least part of the coating vehicle and removing the water by moderate heating. preferably aided by the use of reduced pressures, applied during the mixing cycle. In any event, the transfer of the new pigment into the coating vehicle from the slurry should preferably be effected without the intermediate step of drying of the material particularly at elevated temperatures, that is, substantially in excess of 150° F. as provided in prior practice.

The new pigment may be employed with other cellulose derivatives including cellulose acetate, mixed esters such as cellulose acetobutyrate and cellulose acetopropionate and cellulose ethers, for example, ethyl cellulose. As disclosed in the examples the usual modifying resins for such cellulose derivatives may be used. In the embodiment of the invention in which the pigments above disclosed are incorporated in a cellulose derivative vehicle, there appears to be a unique combination of elements which produce a strikingly transparent, glossy finish. This cooperation between the method of combining the new pigments and the cellulose derivative vehicle and the result produced is different from that obtained using other organic vehicles.

For most purposes, it is preferred to use the hydrous ferric-ferrous oxide in coating compositions in amounts between about 2% and 10% by weight of the total composition depending mainly upon the particular color and to a lesser degree on the transparency desired.

Tinting solutions based on other coloring matter may be mixed with enamels containing the hydrous iron oxide to provide desired color effects but, in general, if the transparent appearance is to be preserved, this added coloring matter should also be substantially transparent, or if opaque in nature, the amount added should be kept at a minimum.

A particularly striking and brilliant finish may be obtained by incorporating a small amount of aluminum powder in the hydrous ferric-ferrous oxide containing enamel as shown in Example 2. This modification affords a result not obtainable by any other known method for producing metallic finishes.

A further modification that comprehends desirable variation in color while retaining transparency, involves the coprecipitation with the hydrous ferric-ferrous oxide of small quantities of other hydrous metal oxides.

Compositions containing the hydrous ferric-ferrous oxides of the present invention are generally useful for coating purposes where transparency coupled with cleanness and depth of color is a requisite. The finishing of automobiles with the new compositions represents an important utility. Particularly effective results for this purpose are obtained when small amounts of aluminum powder are also added to the composition containing the improved hydrous ferric-ferrous oxide. The modification consisting of the addition of suitable amounts of finely divided aluminum powder is also useful for coating paper to provide a metallic finish of great brilliancy and beauty. Other decorative uses for the new compositions are obvious.

The principal advantage in the new compositions resides in the strikingly beautiful transparent appearance that immediately sets it apart from finishes produced from pigments of these colors heretofore employed. Finishes produced from the enamels are outstanding in color and lustre retention showing practically no change in these important properties even after extended outdoor exposure. Improvements with respect to color stability are particularly marked. The requirement that the pigment be transferred to the coating vehicle direct from the pulp state offers important operating economies since certain steps such as drying, dry grinding and then dispersing in the required vehicle usually by further grinding to reduce agglomerates formed in the original dry grinding operation are eliminated. Metallic powders such as aluminum powder may be incorporated with the hydrous ferric-ferrous oxide pigment without difficulty to provide a brilliancy not heretofore obtainable in gray colors.

As many widely different variations may be made in the invention without departing from the spirit and scope thereof, it is to be understood that the invention is not limited to the specific embodiments herein set forth except as defined in the appended claims.

We claim:

1. The process of producing a stable transparent coating composition which comprises precipitating hydrous ferric and ferrous oxide in an aqueous alkaline medium from a mixture of ferric and ferrous salts and subsequently oxidizing the precipitate until the ferric content is between 95% and 99.8% and the ferrous content is between .2% and 5%, and, while the precipitate is still in a wet condition, kneading the resulting hydrous ferric-ferrous oxide pigment with an uncolloided cellulose derivative selected from the group consisting of cellulose esters and cellulose ethers, a blown non-drying vegetable oil, and a solvent plasticizer until the pigment has been transferred from the water to the oil phase, removing the separated water and thereafter adding a solvent, a diluent, and a synthetic resin.

2. The process of claim 1 in which from .025 to 1.0% of finely divided aluminum powder is added to the coating composition.

3. The process of claim 1 in which the cellulose derivative is cellulose nitrate.

4. The process of claim 1 in which the blown oil is blown castor oil.

5. The process of claim 1 in which the hydrous ferric-ferrous oxide pigment is present in amounts between 2% and 10% by weight of the total composition.

6. The process of producing a stable transparent coating composition which comprises oxidizing a solution of ferrous salt to the point where 50% of the iron is in the ferric state, adding an aqueous alkaline solution to precipitate hydrous ferric-ferrous oxide, continuing the oxidation until the ferric content is between 95% and 99.8% and the ferrous content is between .2% and 5%, and, while the precipitate is still in a wet condition, kneading the resulting hydrous ferric-ferrous oxide pigment with an uncolloided cellulose derivative selected from the group consisting of cellulose esters and cellulose ethers, a blown non-drying vegetable oil and a solvent plasticizer until the pigment has been transferred from the water to the oil phase, removing the separated water, and thereafter adding a solvent, a diluent, and a synthetic resin.

7. A stable coating composition comprising an organic film-forming vehicle containing a cellulose derivative selected from the group consisting of water insoluble cellulose esters and cellulose ethers and a hydrous ferric-ferrous oxide pigment having an average particle size diameter of less than 100 millimicrons and consisting of from .2% to 5% ferrous iron and from 99.8% to 95% ferric iron based on the total iron present.

8. The composition of claim 7 in which the average particle size is about 30 millimicrons.

9. The composition of claim 7 in which the hydrous ferric-ferrous oxide is present in amount between 2% and 10% by weight of the total composition.

10. The composition of claim 7 in which the hiding power of the pigment is from 200 to 300 sq. ft. per gal. at 7% concentration.

11. The composition of claim 7 in which the film-forming vehicle is cellulose nitrate.

12. The composition of claim 7 in which from .025 to 1.0% of finely divided aluminum powder is present.

ROBERT T. HUCKS.
ROY R. DENSLOW.

REFERENCES CITED

The following references are of record in the file of this patent:

UNITED STATES PATENTS

| Number | Name | Date |
|---|---|---|
| 2,140,745 | Hucks | Dec. 20, 1938 |
| 2,335,760 | Hucks | Nov. 30, 1943 |